(12) United States Patent
Kim

(10) Patent No.: US 7,633,591 B2
(45) Date of Patent: Dec. 15, 2009

(54) LIQUID CRYSTAL DISPLAY DEVICE

(75) Inventor: Ki Pyo Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 139 days.

(21) Appl. No.: 11/819,468

(22) Filed: Jun. 27, 2007

(65) Prior Publication Data

US 2007/0296904 A1 Dec. 27, 2007

(30) Foreign Application Priority Data

Jun. 27, 2006 (KR) .................. 10-2006-0058087

(51) Int. Cl.
*G02F 1/1345* (2006.01)
(52) U.S. Cl. ...................... 349/151; 349/150
(58) Field of Classification Search .................. 349/150, 349/151
See application file for complete search history.

(56) References Cited

U.S. PATENT DOCUMENTS 7,129,998 B2 * 10/2006 Ohgiichi et al. ............... 349/40

2004/0262653 A1 12/2004 Senda

FOREIGN PATENT DOCUMENTS

CN 1595266 3/2005

* cited by examiner

*Primary Examiner*—Kevin S Wood
(74) *Attorney, Agent, or Firm*—McKenna Long & Aldridge LLP

(57) ABSTRACT

This invention relates to a liquid crystal display device that bias-aging is possible even after spreading silicon over an on/off pad.

A liquid crystal display device according to an embodiment of the present invention includes a liquid crystal display panel where liquid crystal cells are arranged in an active matrix pattern between an upper substrate and a lower substrate, and where a plurality of gate lines and a plurality of data lines are formed; an on/off pad formed on the lower substrate for supplying bias aging signals to the gate line and the data line and checking whether or not the liquid crystal cells are turned on; a drive IC formed on the lower substrate for supplying drive signals to the gate line and the data line; and a printed circuit board which is connected to the lower substrate and which has a signal pad for supplying the drive signal to the drive IC and a bias aging pad for supplying the bias aging signal to the on/off pad.

10 Claims, 3 Drawing Sheets

LIQUID CRYSTAL DISPLAY DEVICE

This application claims the benefit of the Korean Patent Application No. P2006-0058087 filed on Jun. 27, 2006, which is hereby incorporated by reference for all purposes as if fully set forth herein.

BACKGROUND OF THE INVENTION

1. Field of the Invention

The present invention relates to a liquid crystal display device, and more particularly to a liquid crystal display device that allows bias-aging even after spreading silicon over an on/off pad.

2. Discussion of the Related Art

Generally, a liquid crystal display LCD device is a representative flat panel display device that displays a picture by adjusting the transmittance of a light beam corresponding to a video signal. Particularly, the liquid crystal display device is on a trend of its application scope being broadened due to characteristics such as lightness, thinness, lower power consumption drive and the like. According to such a trend, the liquid crystal display device is used in office automation devices and the display devices of notebook computers. Further, the liquid crystal display device has been developed in a direction of wide screen, high definition and low power consumption in response to the needs of users, thereby having rapidly replaced a cathode ray tube in many application fields. Particularly, an active matrix type liquid crystal display device that drives liquid crystal cells using thin film transistors TFTs as switches has an advantage in that its picture quality is excellent and its power consumption is low, and due to the result of research and development and the use of mass production technology, the liquid crystal display device has rapidly been developed to be of large size and high resolution.

The active matrix type liquid crystal display device includes a liquid crystal display panel including liquid crystal cells arranged in an active matrix pattern; and drive circuits for driving the liquid crystal display panel. The liquid crystal display panel includes thin film transistors as a switching device for driving each of the liquid crystal cells. The thin film transistors can be an amorphous type thin film transistor using amorphous silicon or a poly type thin film transistor using poly silicon. Using the poly type thin film transistor allows embedding the drive circuitry in the liquid crystal display panel by using the poly silicon having a charge mobility of about 100 times faster than that of the amorphous silicon.

Referring to FIG. 1, a fabrication process of a liquid crystal display device is briefly described in which a drive circuit is embedded in a liquid crystal display panel. First, an upper substrate 2a where a color filter, a common electrode, a black matrix and the like are formed is bonded with a lower substrate 2b where signal lines such as data lines, gate lines and the like, TFTs, pixel electrodes and the like are formed. A liquid crystal and spacers are injected thereinto through a liquid crystal injection hole, and then the liquid crystal injection hole is sealed off to form a liquid crystal display panel 2. In the liquid crystal display panel 2, the TFT turned on by the gate line has the pixel electrode charged with video signals supplied through the data line, and the light transmittance of the liquid crystal is adjusted in accordance with the video signal, thereby realizing a picture.

At this moment, the lower substrate 2b is made larger in size than the upper substrate 2a, and on/off pads 4 is mounted on the lower substrate 2b. The on/off pads 4 includes first on/off pads 4a which supply clock signals; and second on/off pads 4b which supply R, G, B signals and drive voltages.

The poly type TFT has an advantage in that its charge mobility is fast, but has a problem in that the video signals charged in the pixel electrode is discharged because the leakage current of the poly type TFT is high.

In order to solve the problem associated with high leakage current, external bias aging signals are applied through the second on/off pads 4b to the TFT during the fabrication process to give off-state voltage stress thereto, thereby reducing the leakage current. The bias aging signals are supplied by placing a pogo pin or the like, which is connected to an external signal supplier, in contact with the second on/off pad 4b.

After the bias aging, a cell lighting inspection that checks defect pixels is carried out using signals supplied through the first and second on/off pads 4a and 4b. A repair process is employed to perform a repair on the liquid crystal display panel 2 that is repairable and to dispose of the liquid crystal display panel 2 as a waste if the liquid crystal display panel 2 is not repairable.

A drive integrated circuit (IC) 6 inclusive of a gate drive IC and a data drive IC is mounted on the lower substrate 2b of the liquid crystal display panel 2 after the inspection and repair are completed.

The gate drive IC supplies a scan signal to each of the gate lines and the data drive IC supplies a video signal to each of the data lines.

After the drive IC 6 is mounted, a printed circuit board 8 such as FPC and the like which transmits signals to the drive IC 6 is attached onto the lower substrate 2b through an anisotropic conductive film (ACF). In the printed circuit board 8 is formed a signal pad 10 for applying the signal from the system to the drive IC 6.

Silicon for protecting the drive circuit and the wire line part is spread onto the lower substrate 2b to which the printed circuit board 8 is attached. Because the drive IC 6 receives signals through a wire line, there is no problem in supplying signals to the drive IC 6 even after the protective silicon is spread. However, it is impossible to supply the bias aging signals after the protective silicon is spread onto the lower substrate 2b because the second on/off pads 4b receive the bias signals through direct contact with a pogo pin and the like. That is to say, the liquid crystal display device of the related art has a problem in that the supplying bias aging signals is impossible after the silicon is deposited even through defects such as bright defect, residual image or the like may be generated after the silicon is spread.

SUMMARY OF THE INVENTION

Accordingly, the present invention is directed to a liquid crystal display device that substantially obviates one or more of the problems due to limitations and disadvantages of the related art An advantage of the present invention is to provide a liquid crystal display device that allows bias-aging e even after spreading silicon over an on/off pad.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device according to an aspect of the present invention includes a liquid crystal display panel where liquid crystal cells are arranged in an active matrix pattern between an upper substrate and a lower substrate, and where a plurality of gate lines and a plurality of data lines are formed; an on/off pad mounted on the lower substrate for supplying bias aging signals to the gate line and the data line and checking whether or not the liquid crystal cells are turned on; a drive IC mounted on the lower substrate for supplying drive signals to the gate line and the data line; and a printed circuit board which is connected to the lower substrate and which has a signal pad for supplying the drive signal to the drive IC and a bias aging pad for supplying the bias aging signal to the on/off pad.

In the liquid crystal display device, silicon is spread over the lower substrate where the on/off pad and the drive IC are formed and a connection part of the lower substrate and the printed circuit board.

In the liquid crystal display device, a jig connected to an external bias aging supplier is in contact with the bias aging pad and the on/off pad to supply the bias aging signal thereto.

In the liquid crystal display device, the jig includes a needle or a pogo pin.

In the liquid crystal display device, the on/off pad includes a first on/off pad for supplying clock signals to the gate line and the data line; and a second on/off pad for supplying R, G, B signals and drive voltages to the gate line and the data line.

In the liquid crystal display device, the on/off pad checks whether or not the liquid crystal cells are turned on through the first and second on/off pads, and supplies the bias aging signal to the gate line and the data line through the second on/off pad.

In the liquid crystal display device, the bias aging pad is connected to a wire line and the second on/off pad.

In the liquid crystal display device, the printed circuit board is a flexible printed circuit board.

In the liquid crystal display device, the printed circuit board is attached to the lower substrate through an anisotropic conductive film.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to an embodiment of the present invention, an example of which is illustrated in the accompanying drawings.

Figure 1:
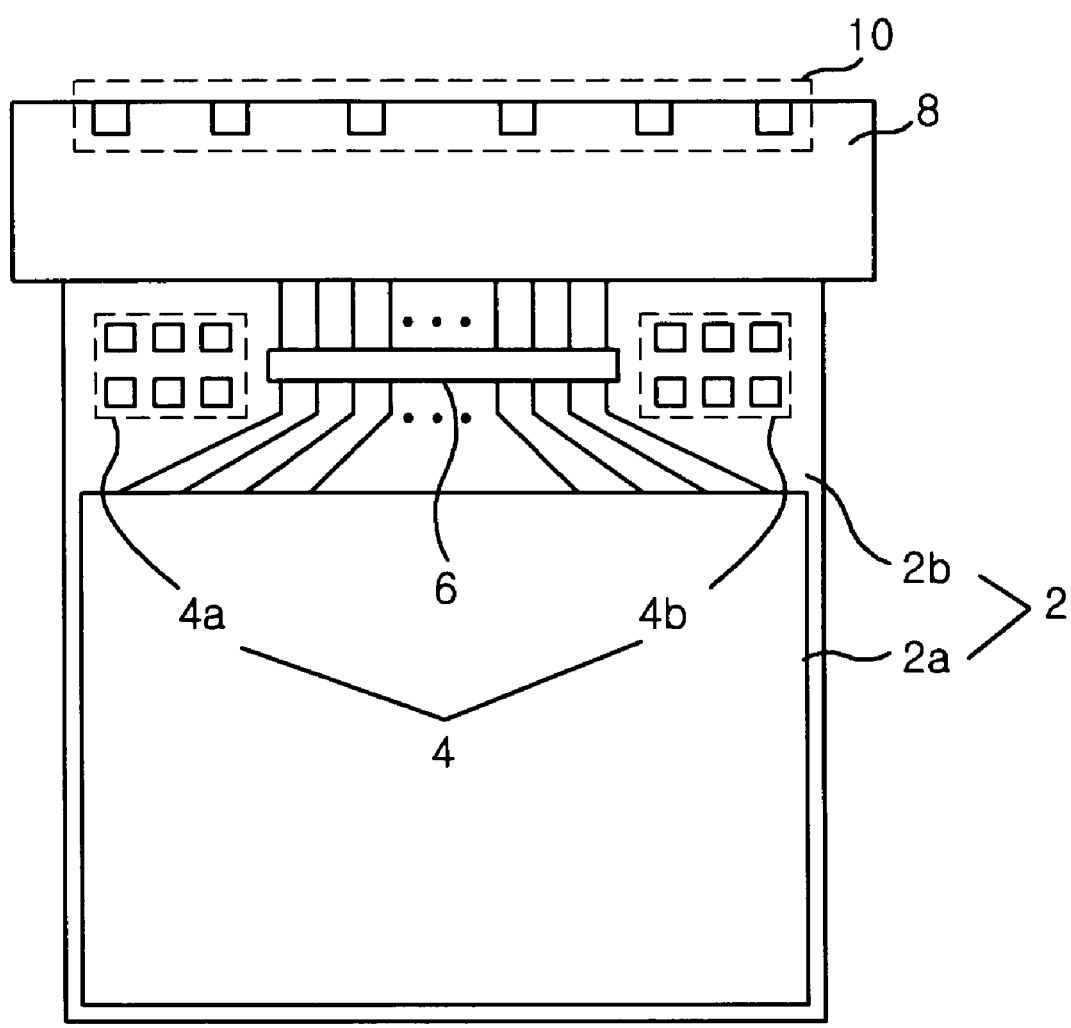
FIG. 1 is a diagram representing a liquid crystal display device of the related art.
Figure 2:
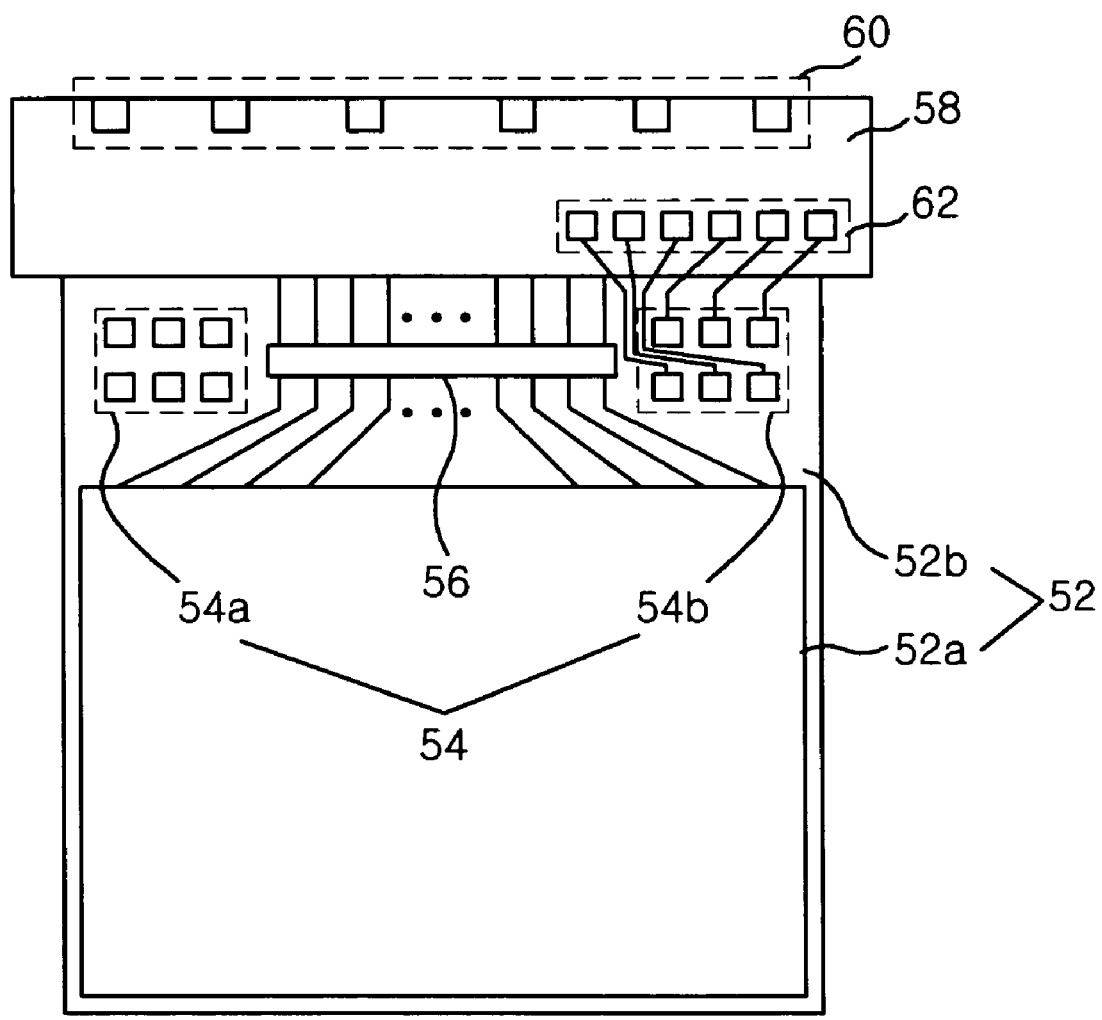
FIG. 2 is a diagram representing a liquid crystal display device according to the present invention.
Figure 3:
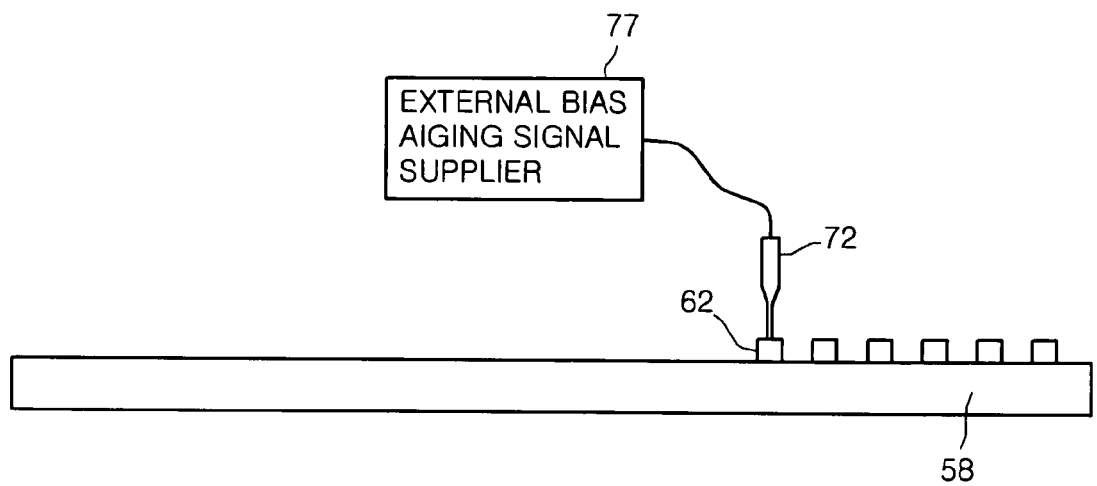
FIG. 3 shows a jug apparatus for supplying a bias aging signal according to the present invention.

With reference to FIG. 2, embodiments of the present invention will be explained as follows.

A liquid crystal display device according to the present invention includes a liquid crystal display panel 52, an on/off pad 54, a drive IC 56, a printed circuit board 58 and the like.

In the liquid crystal display panel 52, liquid crystal cells are formed to be arranged in an active matrix pattern between an upper substrate 52*a* and a lower substrate 52*b*.

On the lower substrate 52*b*, a plurality of data lines and a plurality of gate lines are arranged to cross each other and a TFT is formed at each crossing part thereof.

The TFT supplies video signals from the data line to the liquid crystal cell in response to scan pulses from the gate line. To this end, a gate electrode of the TFT is connected to the gate line, and a source electrode thereof is connected to the data line. A drain electrode of the TFT is connected to a pixel electrode of the liquid crystal cell.

Further, on the lower substrate 52*b* of the liquid crystal display panel 52 is formed a storage capacitor for keeping the voltage of the liquid crystal cell. The storage capacitor can be formed between the liquid crystal cell and the pre-stage gate line, and can be formed between the liquid crystal cell and a separate common line.

In the upper substrate 52*a* of the liquid crystal display panel 52 are formed a color filter, a common electrode, a black matrix and the like.

In each of the upper substrate 52*a* and the lower substrate 52*b* are formed a polarizer for filtering a linearly polarized light and an alignment film for setting a pre-tilt angle of liquid crystal molecules.

The liquid crystal molecules are driven in accordance with the electric field between the common electrode of the upper substrate 52*a* and the pixel electrode of the lower substrate 52*b*, thereby modulating the light incident from a backlight unit through the polarizer.

The liquid crystal display panel 52 is made for the lower substrate 52*b* to be bigger in size than the upper substrate 52*a*. On the lower substrate 52*b* is mounted a drive IC 56 inclusive of a gate drive IC and a data drive IC. The gate drive IC supplies scan signals to each of the gate lines and the data drive IC supplies video signals to each of the data lines. To this end, on the lower substrate 52*b* are formed wire lines that supply signals to the drive IC 56 from an external source and wire lines that supplies signals to the gate lines and the data lines of the liquid crystal display panel 52 from the drive IC 56.

Further, on the lower substrate 52*b* of the liquid crystal display panel 52 are mounted the on/off pads 54 prior to the drive IC 56. The on/off pads 54 includes first on/off pads 54*a* that supply clock signals; and second on/off pads 54*b* that supply R, G, B signals and drive voltages. On the lower substrate 52*b* are formed wire lines that connects the first and second on/off pads 54*a* and 54*b* to the gate lines and the data lines of the liquid crystal display panel 52; and a wire line which supplies signals to the second on/off pad 54*b* from an external source.

The TFT of the liquid crystal display panel 52 is formed to be a poly type TFT or an amorphous type TFT. Among these, the poly type TFT uses poly silicon of which the charge mobility is about 100 times faster than amorphous silicon, thereby making it possible for the drive circuit to be embedded in the liquid crystal display panel. However, the poly type TFT has a problem in that the video signal charged in the pixel electrode is discharged because the leakage current is high.

To solve this, bias-aging signals are applied from the outside through the second on/off pads 54*b* to the TFT of the liquid crystal display panel 52 in the fabrication process to give off-state voltage stress thereto, thereby reducing the leakage current. The bias-aging signals are supplied by using a jig 72 inclusive of a pogo pin, needle or the like, which is connected to an external bias aging signal supplier 77, in contact with the second on/off pads 54b.

After performing the bias aging, a cell lighting inspection for identifying defect pixels is carried out in using signals supplied through the first and second on/off pads 54a, 54b. A repair process is performed on the liquid crystal display panel 52 having a repairable defect, and the liquid crystal display panel 52 is disposed of as waste if the liquid crystal display panel 52 is not repairable.

The aforementioned drive IC 56 is mounted on the lower substrate 52b of the liquid crystal display panel 52 after the inspection and repair processes are completed.

After the drive IC 56 is mounted, a printed circuit board 58 such as FPC and the like that transmits signals to the second on/off pads 54b and the drive IC 56 is attached to the lower substrate 52b through an anisotropic conductive film (ACF). On the printed circuit board 58 are formed a signal pad 60 for applying the signal from the system to the drive IC 56; and a bias aging pad 62 for applying the bias aging signal from the external bias aging signal supplier to the second on/off pad 54b.

A silicon for protecting the drive circuit and the wire line part is spread on the lower substrate 52b to which the printed circuit board 58 is stuck. At this moment, the liquid crystal display device of the related art directly supplies the bias aging signal to the second on/off pad 54b, thus the bias aging is impossible even through defects such as bright defect, residual image or the like caused by the leakage current are generated after the silicon is spread. However, the liquid crystal display device according to the present invention, as described above, primarily supplies the bias aging signal to the second on/off pad 54b by a direct contact through a jug 72 inclusive of the pogo pin, the needle and the like, and supplies the bias aging signal to the bias aging pad 62 connected through the second on/off pad 54b and the wire line through the jig 72 inclusive of the pogo pin, the needle and the like even after spreading silicon over the second on/off pad 54b. Because of this, the second on/off pad 54b can receive the bias aging signal through the bias aging pad 62, and the bias aging is possible at any time in case that the defect is generated due to the leakage current.

As described above, the liquid crystal display device according to the present invention forms second on/off pads on the lower substrate of the liquid crystal display panel, thus it is possible to supply a primary bias aging signal. Further, a bias aging pad connected to the wire line and the second on/off pad is formed on the printed circuit board, thus an additional bias aging is possible even after the silicon is spread over the drive circuit including the second on/off pad.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
    a liquid crystal display panel where liquid crystal cells are arranged in an active matrix pattern between an upper substrate and a lower substrate, the lower substrate including a plurality of gate lines crossing a plurality of data lines;
    an on/off pad formed on the lower substrate for supplying bias aging signals to the gate lines and the data lines and for checking whether or not the liquid crystal cells are turned on;
    a drive IC formed on the lower substrate for supplying drive signals to the gate lines and the data lines; and
    a printed circuit board which is connected to the lower substrate including a signal pad for supplying the drive signals to the drive IC and a bias aging pad connected to the on/off pad for supplying the bias aging signals to the on/off pad.

2. The liquid crystal display device according to claim 1, wherein silicon is spread on the on/off pad and the drive IC on the lower substrate and on a connection part of the lower substrate connecting circuits on the lower substrate to the printed circuit board.

3. The liquid crystal display device according to claim 1, including jig connected to an external bias aging supplier that contacts the bias aging pad to supply the bias aging signal thereto.

4. The liquid crystal display device according to claim 3, wherein the jig includes a needle.

5. The liquid crystal display device according to claim 3, wherein the jig includes a pogo pin.

6. The liquid crystal display device according to claim 1, wherein the on/off pads includes:
    first on/off pads for supplying clock signals to the gate lines and the data lines; and
    second on/off pads for supplying R, G, B signals and drive voltages to the gate lines and the data lines.

7. The liquid crystal display device according to claim 6, wherein the on/off pads are connected to determine whether or not the liquid crystal cells are turned on by signals applied through the first and second on/off pads, and wherein the on/off pads supply the bias aging signal to the gate lines and the data lines through the second on/off pads.

8. The liquid crystal display device according to claim 7, wherein the bias aging pads are connected to a wire line and the second on/off pads.

9. The liquid crystal display device according to claim 1, wherein the printed circuit board is a flexible printed circuit board.

10. The liquid crystal display device according to claim 1, wherein the printed circuit board is attached to the lower substrate through an anisotropic conductive film.

* * * * *